United States Patent
Jau (10) Patent No.: US 8,016,939 B2
(45) Date of Patent: Sep. 13, 2011

(54) SELF-CURING CONCRETE

(76) Inventor: Wen-Chen Jau, Hsinchu (TW)

( * ) Notice: Subject to any disclaimer, the term of this patent is extended or adjusted under 35 U.S.C. 154(b) by 1060 days.

(21) Appl. No.: 11/802,243

(22) Filed: May 21, 2007

(65) Prior Publication Data

US 2008/0072799 A1    Mar. 27, 2008

(30) Foreign Application Priority Data

May 23, 2006    (CN) .......................... 2006 1 0080647

(51) Int. Cl.
*C04B 24/02*    (2006.01)
(52) U.S. Cl. ........................................ 106/724; 106/823
(58) Field of Classification Search .................. 106/724, 106/823
See application file for complete search history.

(56) References Cited

U.S. PATENT DOCUMENTS

| | | | | |
|---|---|---|---|---|
| 2,959,489 A * | 11/1960 | Wagner | .......................... | 106/727 |
| 3,573,942 A * | 4/1971 | Wassenberg | ................. | 106/227 |
| 4,211,572 A * | 7/1980 | Wagner et al. | ................. | 106/727 |
| 5,716,447 A * | 2/1998 | Matsuo et al. | ................. | 106/802 |
| 6,166,119 A * | 12/2000 | Matsuo et al. | ................. | 524/376 |
| 6,468,344 B1 * | 10/2002 | Liang et al. | .................... | 106/660 |
| 6,849,118 B2 * | 2/2005 | Kerkar et al. | ................. | 106/823 |

* cited by examiner

*Primary Examiner* — Paul Marcanton
(74) *Attorney, Agent, or Firm* — Muncy, Geissler, Olds & Lowe, PLLC (57) ABSTRACT

A self-curing concrete is provided to absorb water from atmosphere from air to achieve better hydration of cement in concrete. It solves the problem that the degree of cement hydration is lowered due to no curing or improper curing, and thus unsatisfactory properties of concrete. According to the invention, high-performance self-curing agent about 0.1~5 wt % of cement weight of the concrete is added to concrete during mixing. The self-curing agent can absorb moisture from atmosphere and then release it to concrete. The self-curing concrete means that no curing is required for concrete, or even no any external supplied water is required after placing. The properties of this self-cured concrete of this invention are at least comparable to and even better than those of concrete with traditional curing.

10 Claims, 7 Drawing Sheets

SELF-CURING CONCRETE

FIELD OF THE INVENTION

The present invention relates generally to a concrete, and more particularly to a self-curing concrete which features water absorbability and humectation.

BACKGROUND OF THE INVENTION

If no any curing measure is taken for concrete against natural setting or hardening, substantial water losses will occur due to fast water evaporation, thus prevents cement from hydration and leads to dusting or drying crack on concrete surface. In such case, the strength and durability of concrete will be reduced. After placing of concrete, curing shall be duly required to avoid water loss and drying crack. External curing is generally required for concrete after placing. In other words, water spraying or covering by plastic membrane or burlaps is applied to concrete surface to maintain enough moisture, namely, so-called "moist curing" is performed to ensure full cement hydration for a higher compressive strength. However, "moist curing" method needs regular maintenance such as manual watering, sprinkling or spraying, while repetitive wetting and drying will result in cracks against structural integrity.

In addition, available common methods for curing concrete include membrane curing and water-proof covering. According to membrane curing method, when liquid membrane-forming compounds for curing concrete (also referred to as membrane protective agent) is sprayed onto fresh concrete surface, the curing agent will rapidly form a water-proof film on the concrete surface, which prevents water evaporation and provides hydration conditions for cement. The curing agents, which are generally made of silica gel or latex film, can easily aggregate at depressed concrete surface, thus reducing the surface friction coefficient. Water-proof covering method applies only to large-sized simple structure. Despite of domestic and foreign regulations on "proper curing", the relevant research shows that, even the most fundamental curing requirements are not met, or totally ignored in practical engineering.

SUMMARY OF THE INVENTION

The major object of the present invention is to provide a self-curing concrete. Self-curing agent can absorb moisture from atmosphere and then release the moisture into concrete. It's added into concrete during mixing, such that concrete can be self-cured after placing without the need of any external curing. Thus, water evaporation after removal of formworks can be reduced, and the degree of cement hydration improved without extra standard curing. Furthermore, compressive strength will be enhanced with the reduced shrinkage arising from water evaporation, making it ideal for concrete placing without any external curing.

In the present invention, the self-curing agent, which can absorb moisture from atmosphere and then release the moisture to concrete, is added to self-curing concrete during mixing, such that concrete can be self-cured after placing without the need of any external curing. When a specific amount of self-curing agent is provided, the compressive strength of self-curing concrete may be increased at least 10% as compared to that of concrete without any curing. The added self-curing agent accounts about 0.1~5 wt % of cement weight of the concrete. In the preferred embodiment, the added amount of self-curing agent accounts 2 wt % of cement weight of the concrete. This allows simple and cost-effective curing of concrete to meet the requirement of quality control and construction design inspections.

DETAIL DESCRIPTION OF THE INVENTION

The features and the advantages of the present invention will be more readily understood upon a thoughtful deliberation of the following detailed description of a preferred embodiment of the present invention with reference to the accompanying drawings.

To ensure a simple and efficient curing of concrete, the high-performance self-curing agent of the present invention, which features higher humectation and water absorbability, shall be added to the mixed concrete for self-curing purpose. "Self-curing concrete" means that no labor work is required to provide water for concrete, or even no any external curing is required after placing which the properties of this concrete are at least comparable to and even better than those of concrete with traditional curing.

Figure 1:
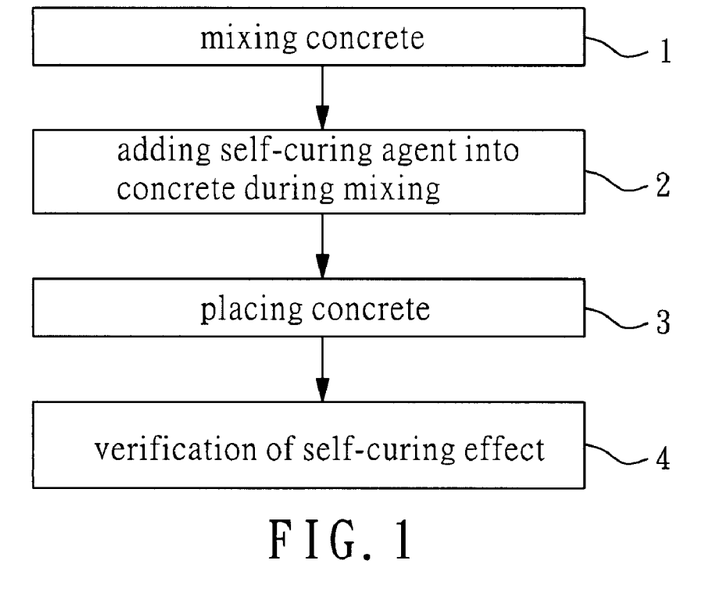
FIG. 1 shows the flow chart of self-curing concrete of the present invention.

Referring to FIG. 1, a work flow of self-curing method comprises: step 1: "mixing concrete"; step 2: "adding self-curing agent into concrete during mixing"; step 3: "placing concrete"; step 4: "verification the effect of self-curing".

Firstly, an optional concrete mixture proportion is selected for step 1, which contains coarse aggregates, fine aggregates, cement, pozzolans (optional), superplasticizer (optional) and mixing water, such as ordinary Portland concrete (OPC), self-consolidating concrete (SCC), high-performance concrete (HPC), lightweight concrete or mass concrete. In step 2, the self-curing agent included polyvalent alcohol, selected from the group consisting of polyethylene glycol (PEG), propylene glycol (PG), dipropylene glycol (DPG), butylene glycol, neopently glycol (NPG), xylitol, sorbitol and glycerine; or phytosterols, hyaluronic acid, polyxyethylene (POE), sodium pyrrolidone carboxylate (PCA-Na), stearyl alcohol, cetyl alcohol or poly-acrylic acid, are added to concrete during mixing. The added self-curing agent accounts about 0.1 to 5 wt % of cement weight of the concrete. In the preferred embodiment, the added amount of self-curing agent accounts 2 wt % of cement weight of the concrete. In other words, the added amount of self-curing agent is proportional to cement weight of the concrete. For example, the self-curing material made of poly-acrylic acid is characterized by its strong capability of absorbing moisture from atmosphere and providing water required for curing concrete.

In the preferred embodiment of the present invention, ordinary Portland concrete (OPC) and self-consolidating concrete (SCC) were tested and compared to verify the function of water loss reduction. The test results for OPC are shown in Table 1 and 2, and those for SCC shown in Table 3 and 4. Yet, the following tests provide only typical results for the efficacy of the present invention.

TABLE 1

Water Loss for OPC (RH = 67.50%)

w/c = 0.6
(w/b = 0.37)

| admixture | water weight loss (unit: g) | | | | weight loss ratio |
|---|---|---|---|---|---|
| | 1 day | 2 days | 4 days | 7 days | |
| plain concrete | 0 | 60.5 | 110.5 | 121.9 | 1 |
| 1% self-curing agent | 0 | 58.5 | 102.4 | 112.7 | 0.924 |
| 2% self-curing agent | 0 | 54.1 | 98.85 | 110.5 | 0.906 |

TABLE 2

Water Loss for OPC (RH = 85%)

w/c = 0.6
(w/b = 0.37)

| admixture | water weight loss (unit: g) | | | | weight loss ratio |
|---|---|---|---|---|---|
| | 1 day | 2 days | 4 days | 7 days | |
| plain concrete | 0 | 52.8 | 104.9 | 114 | 1 |
| 1% self-curing agent | 0 | 48.5 | 90.9 | 104.5 | 0.917 |
| 2% self-curing agent | 0 | 43.1 | 81.1 | 97.6 | 0.856 |

Figure 2A:
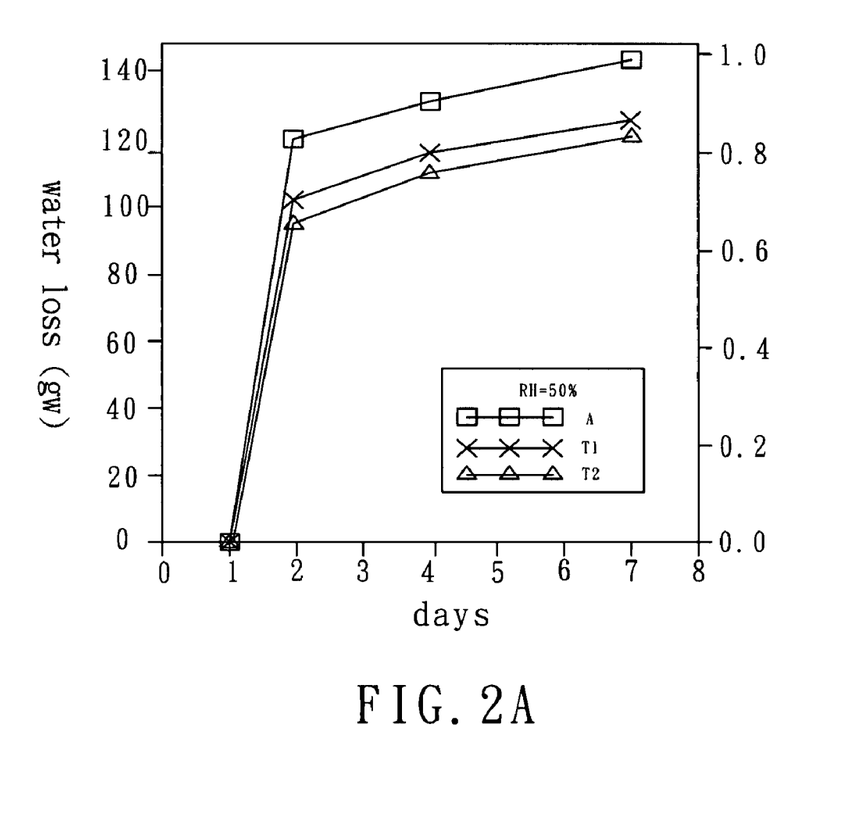
FIGS. 2A to 2C show the comparison diagram of water loss and duration of OPC under different curing conditions at RH=50%, RH=67.5% and RH=85%.
Figure 2B:
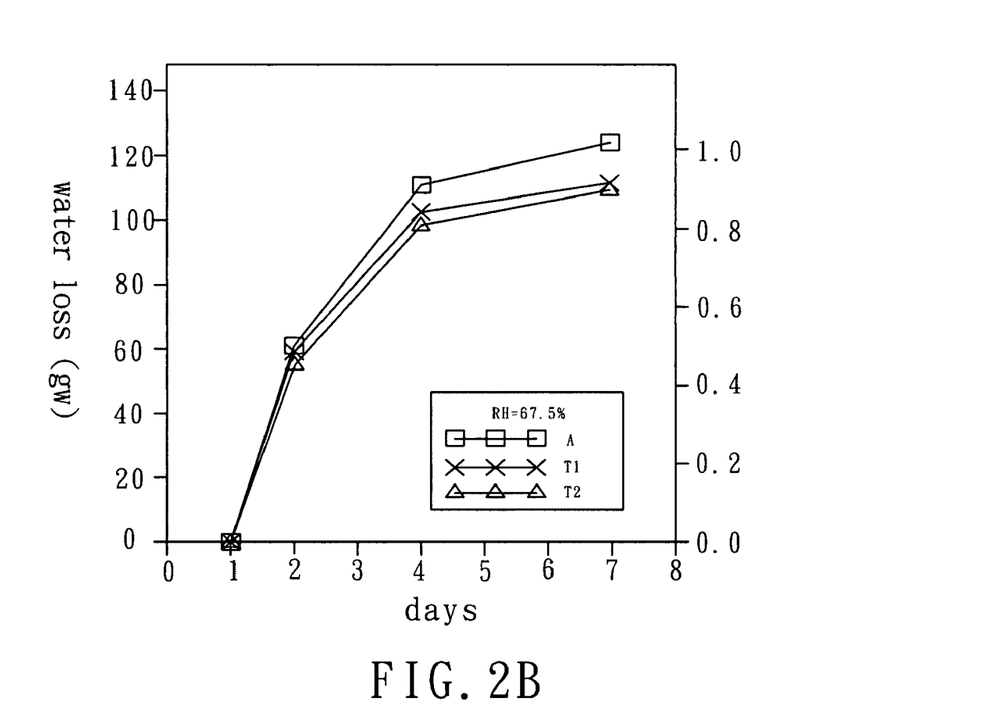
Figure 2C:
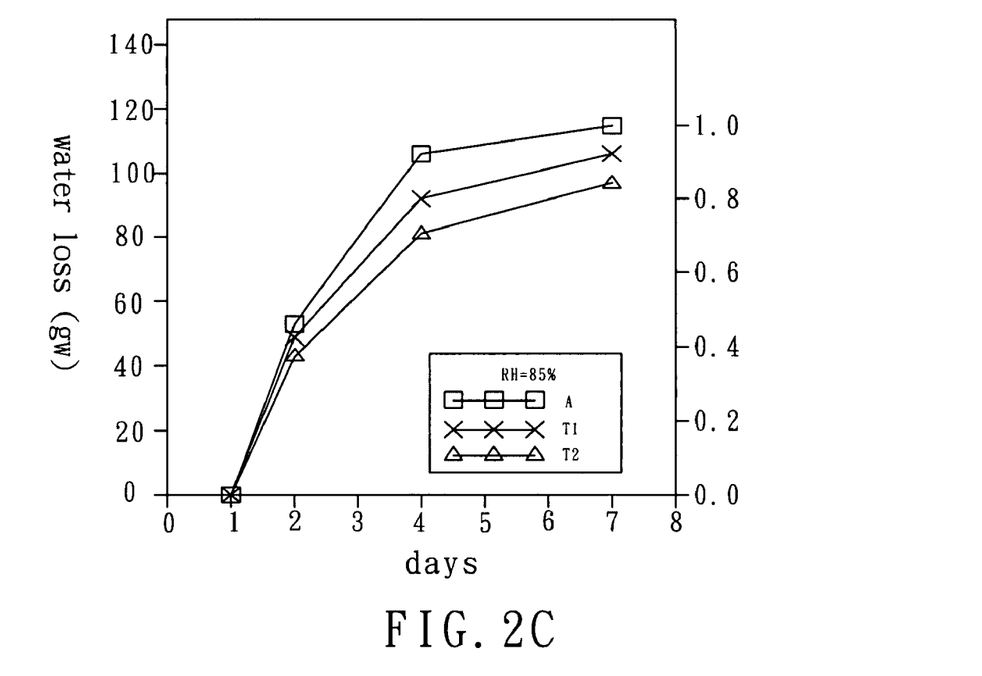

Of which, RH represents relative humidity. As listed in Table 1 and 2, self-curing concrete of the present invention can reduce water loss for desirable self-curing effect based on OPC, whether 1% or 2% self-curing agent is added thereto. Referring also to FIGS. 2A, 2B, 2C, self-curing concrete of the present invention can be evidenced by reduction of water loss OPC, either in RH 50%, 67.5% or 85%.

TABLE 3

Water Loss for SCC (RH = 67.50%)

w/c = 0.6
(w/b = 0.37)

| admixture | water loss (unit: gw) | | | | weight loss ratio |
|---|---|---|---|---|---|
| | 1 day | 2 days | 4 days | 7 days | |
| plain concrete | 0 | 61.6 | 91.1 | 101.2 | 1 |
| adding 1% self-curing agent | 0 | 53.4 | 80.7 | 90.2 | 0.891 |
| adding 2% self-curing agent | 0 | 49.2 | 75 | 86.6 | 0.855 |

TABLE 4

Water Loss for SCC (RH = 85%)

w/c = 0.6
(w/b = 0.37)

| admixture | water loss (unit: gw) | | | | weight loss ratio |
|---|---|---|---|---|---|
| | 1 day | 2 days | 4 days | 7 days | |
| plain concrete | 0 | 51.3 | 90.5 | 95.9 | 1 |
| adding 1% self-curing agent | 0 | 42.8 | 80.1 | 85.2 | 0.888 |
| adding 2% self-curing agent | 0 | 38.3 | 74.4 | 79.6 | 0.830 |

Figure 3A:
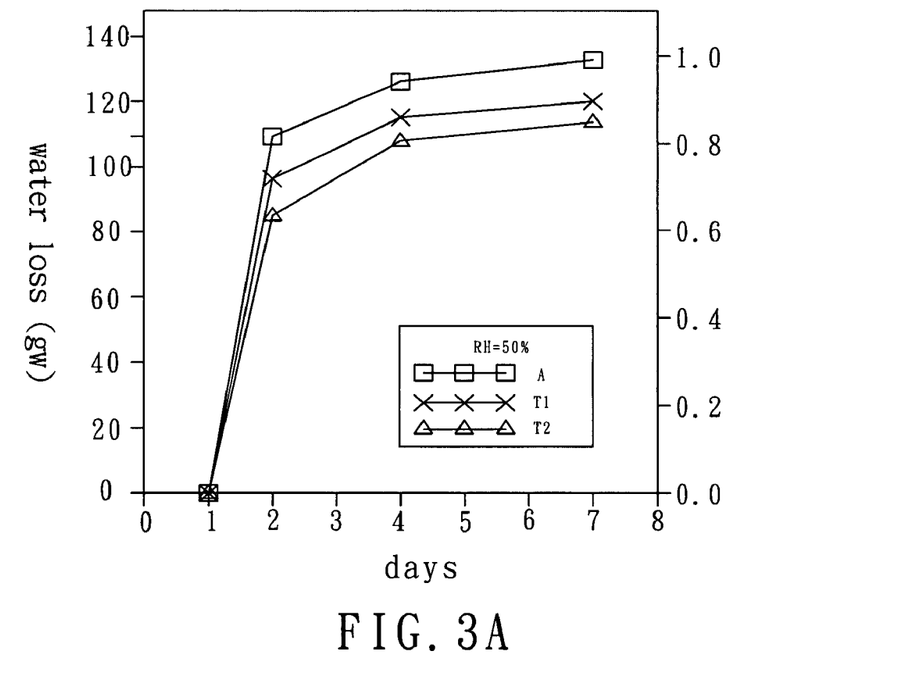
FIGS. 3A to 3C show the comparison diagram of water loss and duration of SCC under different curing conditions at RH=50%, RH=67.5% and RH=85%.
Figure 3B:
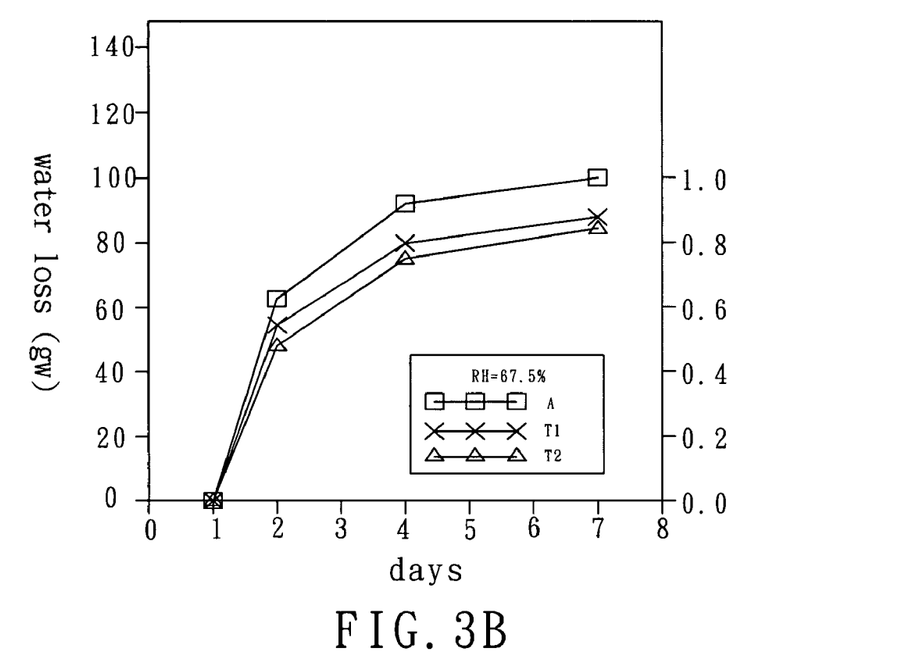
Figure 3C:
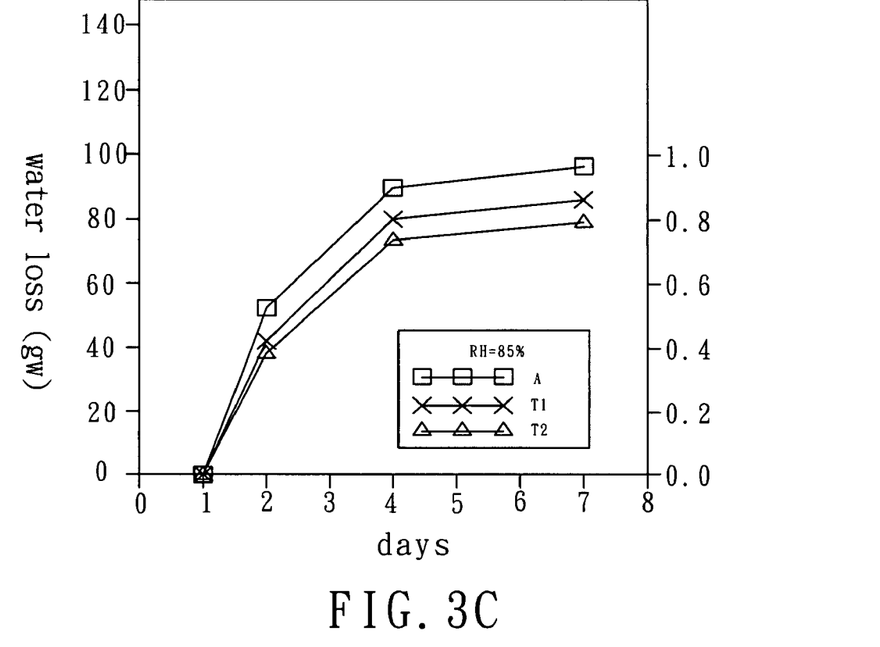

As listed in Table 3 and 4, self-curing concrete of the present invention can reduce water loss for desirable self-curing-based on SCC, whether 1% or 2% self-curing agent is added thereto. Referring also to FIGS. 3A, 3B, 3C, self-curing concrete of the present invention can be self-cured evidenced by reduction of water loss of SCC, under RH 50%, 67.5% or 85%.

Figure 4A:
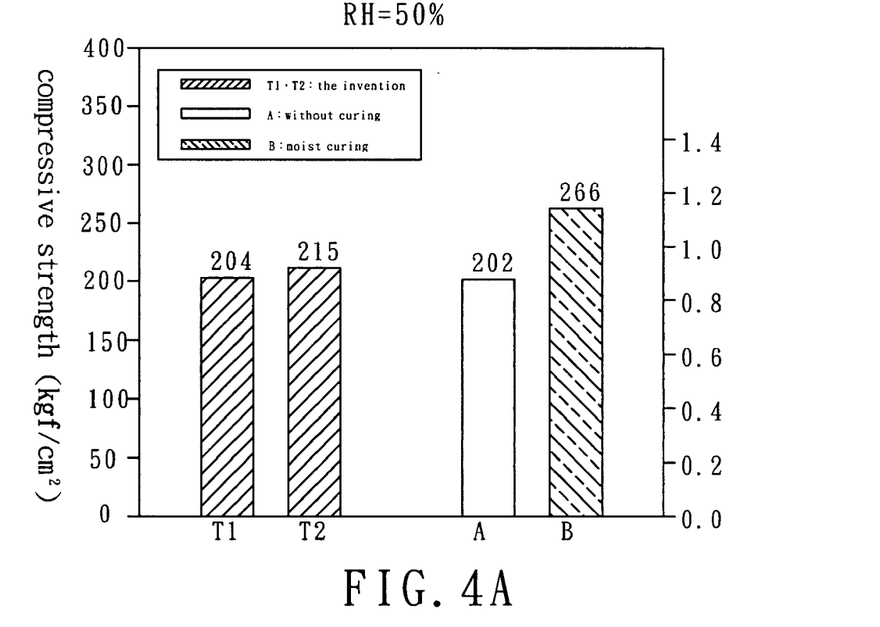
FIGS. 4A to 4C show the comparison diagram of compressive strength of OPC under different curing conditions at RH=50%, RH=67.5% and RH=85%.
Figure 4B:
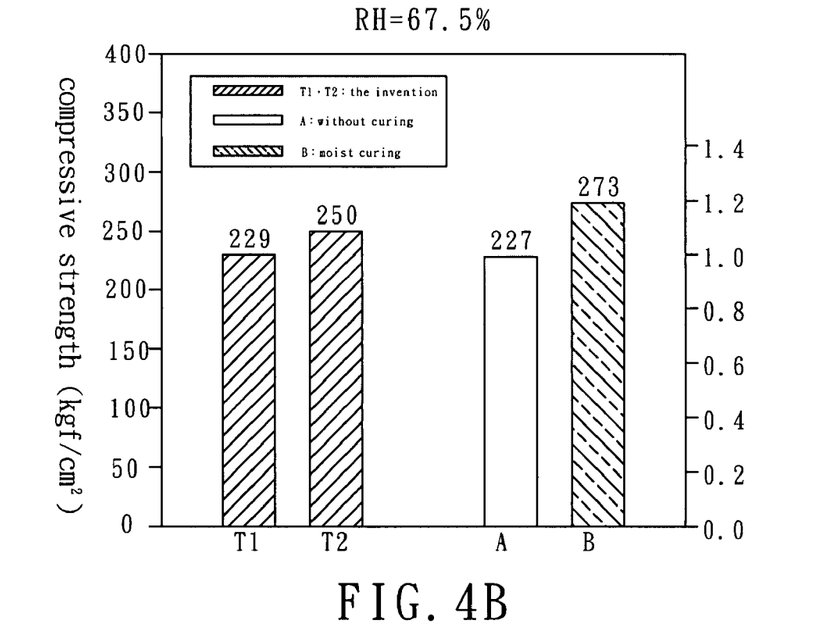
Figure 4C:
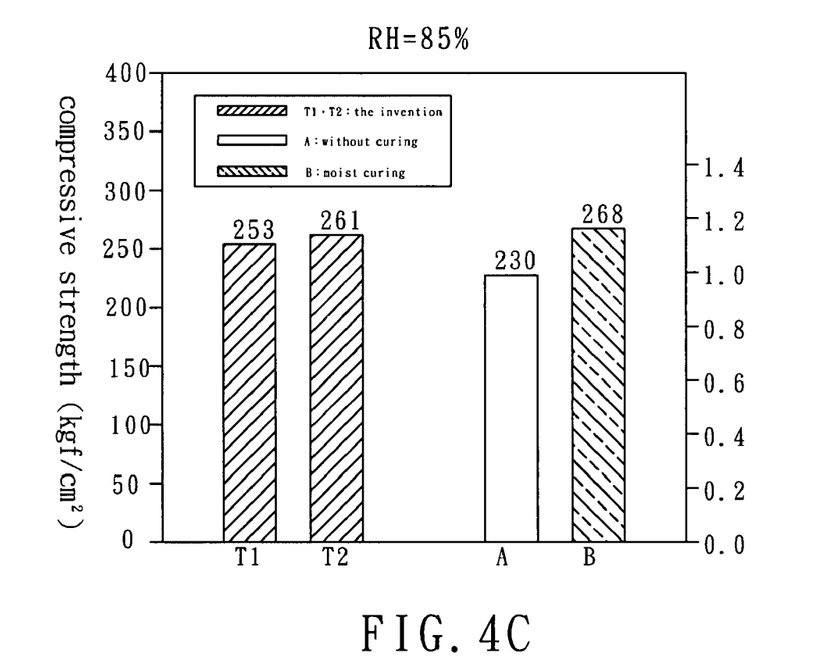

In addition, FIGS. 4A, 4B and 4C show the comparative compressive strengths of OPC (ordinary Portland concrete) with self-curing agent but no extra water curing, without any curing under RH=50%, RH=67.5% and RH=85%, and with moist curing. A represents OPC without curing, B represents OPC with standard moist curing, of which the basic OPC concrete compositions of T1, T2, A and B are almost the same except for the self-curing agent. The added amount of the self-curing agent in T1 is about 1 wt % of cement weight of OPC, in T2 about 2 wt % of cement weight. For all the cases of RH 50%, 67.5% and 85%, self-curing concrete T1 and T2 of the present invention have a higher compressive strength than normal concrete A without curing and close to concrete B with standard moist curing. The compressive strengths are (204 and 215) versus 202, (229 and 250) versus 227, (253 and 261) versus 268 (unit: kgf/cm$^2$; 1 MPa=10.1972 kgf/cm$^2$) respectively. It's thus concluded that, self-curing agent can easily absorb moisture from atmosphere and then release it into concrete. Self-curing concrete of the present invention features a better compressive strength of OPC.

Figure 5A:
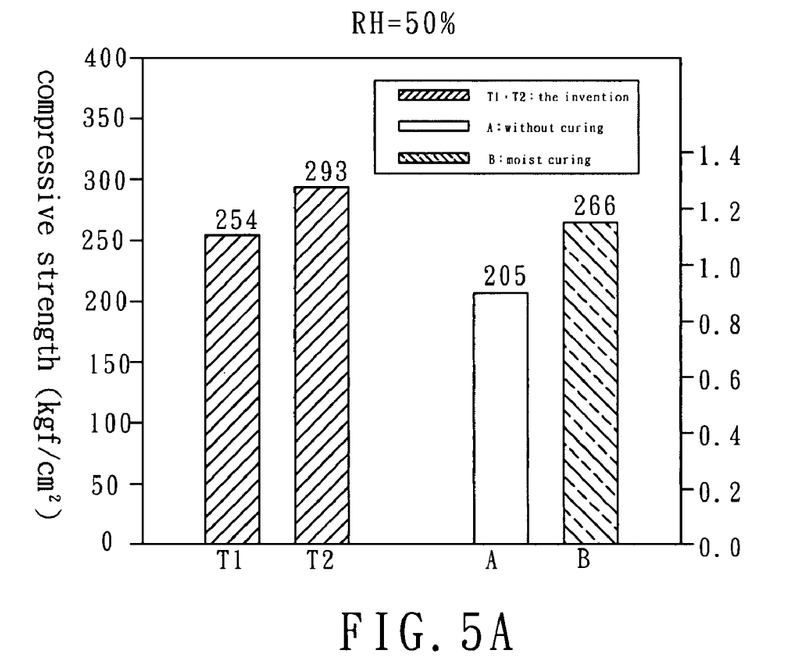
FIGS. 5A to 5C show the comparison diagram of compressive strength of SCC under different curing conditions at RH=50%, RH=67.5% and RH=85%.
Figure 5B:
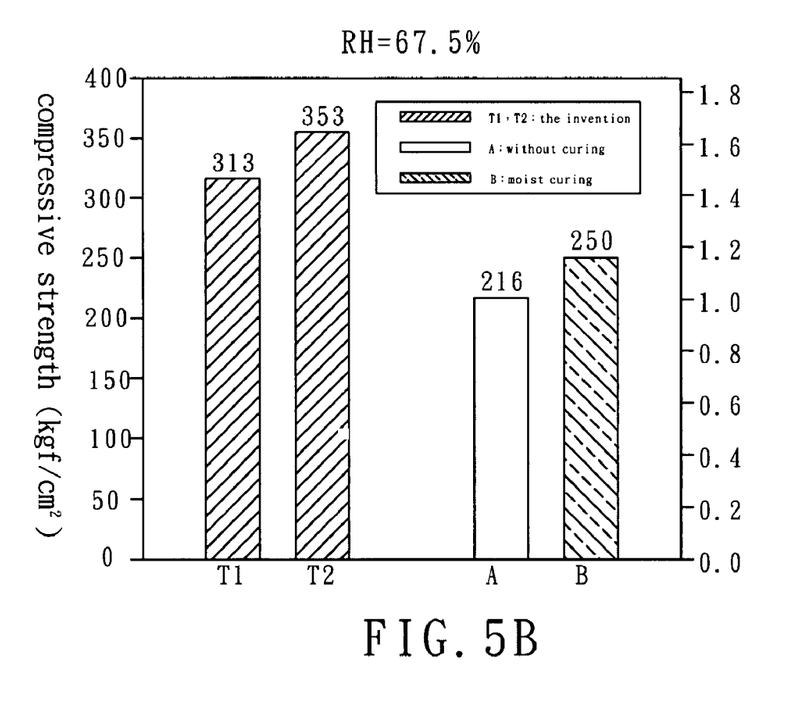
Figure 5C:
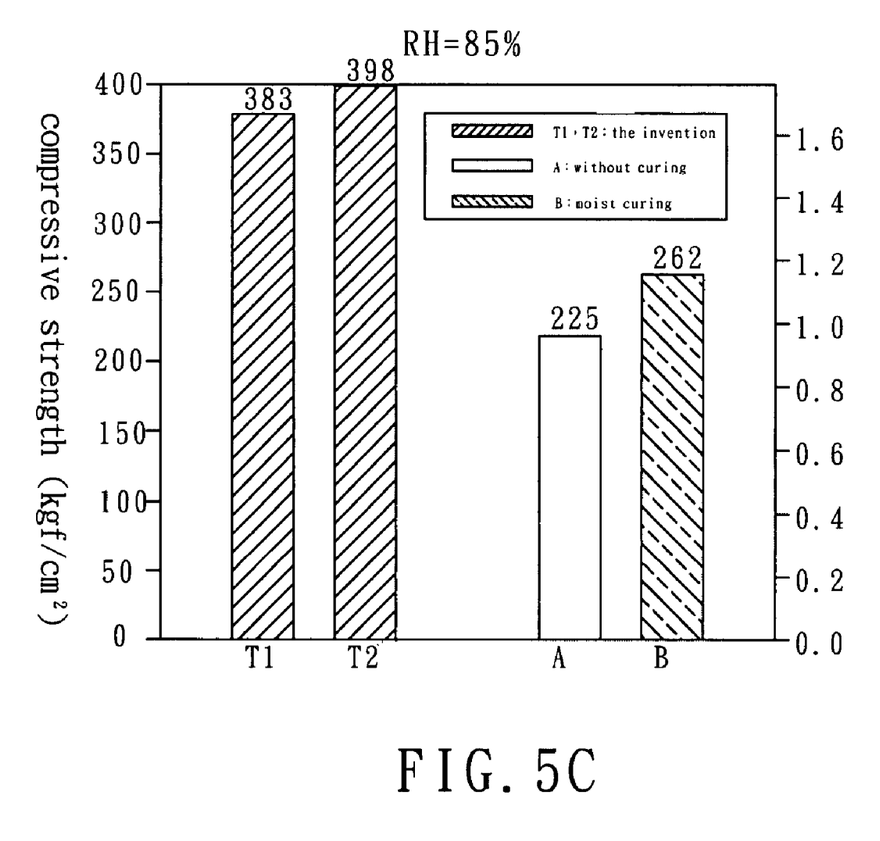

Besides, self-curing concrete of the present invention provides a better compressive strength when applied to SCC (self-consolidating concrete). This is because the self-curing agent added to concrete can absorb moisture from atmosphere and then release to concrete. Referring to FIGS. 5A, 5B, 5C, self-curing concrete T1 and T2 of the present invention, for the cases of RH 50%, 67.5% or 85%, SCC have a higher compressive strength than SCC concrete A without any curing and SCC concrete B with moist curing, of which the basic SCC concrete compositions of T1, T2, A and B are almost the same except for the self-curing agent. It's calculated that, the compressive strength of self-curing concrete T1 and T2 is 10% higher than that of SCC A without curing in same RH conditions, i.e, (254 and 293) versus 205, (313 and 353) versus 216, (383 and 398) versus 225 (unit: kgf/cm$^2$; 1 MPa=10.1972 kgf/cm$^2$) respectively. With the higher RH, compressive strength of self-curing concrete T1 and T2 of the present invention is improved significantly, or even higher than the compressive strength of SCC B with standard moist curing. This indicates that self-curing concrete of the present invention needs no long-lasting moist curing, which saves cost and guarantees a higher compressive strength and better quality.

Although the invention has been explained in relation to its preferred embodiment, it is to be understood that many other possible modifications and variations can be made without departing from the spirit and scope of the invention as hereinafter claimed.

What is claimed is:

1. A self-curing concrete primarily comprising coarse aggregates, fine aggregates, cement, and mixing water, and further comprising a self-curing agent added during mixing, wherein the self-curing agent absorbs moisture from air and then releases it into the concrete, thereby achieving self-curing without external curing method after placing, wherein a specific amount of the self-curing agent is added to the concrete such that a 10% higher compressive strength than that of concrete without curing is achieved, wherein the added solid amount of the self-curing agent is about 1-2 wt % of cement weight of the concrete, wherein the added self-curing agent comprises polyvalent alcohol selected from the group consisting of xylitol, sorbitol, phytosterols and butylene glycol.

2. The self-curing concrete as claimed in claim 1, wherein the said concrete is a self-consolidating concrete.

3. The self-curing concrete as claimed in claim 1, wherein the said concrete is a Portland cement concrete.

4. The self-curing concrete as claimed in claim 1, wherein the said concrete is a high performance concrete.

5. A self-curing concrete primarily comprising coarse aggregates, fine aggregates, cement, and mixing water, and further comprising a self-curing agent added during mixing, wherein the self-curing agent absorbs moisture from air and then releases it into the concrete, thereby achieving self-curing without external curing method after placing, wherein a specific amount of the self-curing agent is added to the concrete such that a 10% higher compressive strength than that of concrete without curing is achieved, wherein the added solid amount of the self-curing agent is about 0.1 to 5 wt % of cement weight of the concrete, wherein the added self-curing agent is sodium pyrrolidone carboxylate.

6. A self-curing concrete primarily comprising coarse aggregates, fine aggregates, cement, and mixing water, and further comprising a self-curing agent added during mixing, wherein the self-curing agent absorbs moisture from air and then releases it into the concrete, thereby achieving self-curing without external curing method after placing, wherein a specific amount of the self-curing agent is added to the concrete such that a 10% higher compressive strength than that of concrete without curing is achieved, wherein the added solid amount of the self-curing agent is about 0.1 to 5 wt % of cement weight of the concrete, wherein the material of the added self-curing agent is selected from the group consisting of stearyl alcohol and cetyl alcohol.

7. A self-curing concrete primarily comprising coarse aggregates, fine aggregates, cement, and mixing water, and further comprising a self-curing agent added during mixing, wherein the self-curing agent absorbs moisture from air and then releases it into the concrete, thereby achieving self-curing without external curing method after placing, wherein a specific amount of the self-curing agent is added to the concrete such that a 10% higher compressive strength than that of concrete without curing is achieved, wherein the added solid amount of the self-curing agent is about 0.1-5 wt % of cement weight of the concrete, wherein the added self-curing agent is selected from the group consisting of sodium pyrrolidone carboxylate, hyaluronic acid and polyxyethylene.

8. The self-curing concrete as claimed in claim 7, wherein the said concrete is a self-consolidating concrete.

9. The self-curing concrete as claimed in claim 7, wherein the said concrete is a Portland cement concrete.

10. The self-curing concrete as claimed in claim 7, wherein the said concrete is a high performance concrete.

\* \* \* \* \*